(12) United States Patent
Di Pietro et al.

(10) Patent No.: US 11,540,234 B2
(45) Date of Patent: Dec. 27, 2022

(54) AUTOMATED NARROW PEAK INTERFERENCE SEVERITY ESTIMATION

(71) Applicant: EXFO Inc., Quebec (CA)

(72) Inventors: Marco Di Pietro, Montreal (CA); Martin Levesque, Ile Bizard (CA)

(73) Assignee: EXFO Inc., Quebec (CA)

( * ) Notice: Subject to any disclaimer, the term of this patent is extended or adjusted under 35 U.S.C. 154(b) by 77 days.

(21) Appl. No.: 17/108,716

(22) Filed: Dec. 1, 2020

(65) Prior Publication Data

US 2021/0176716 A1    Jun. 10, 2021

Related U.S. Application Data

(60) Provisional application No. 63/011,621, filed on Apr. 17, 2020, provisional application No. 62/944,142, filed on Dec. 5, 2019.

(51) Int. Cl.
*H04W 52/34* (2009.01)
*H04W 24/10* (2009.01)
*H04W 52/36* (2009.01)

(52) U.S. Cl.
CPC .......... *H04W 52/34* (2013.01); *H04W 24/10* (2013.01); *H04W 52/36* (2013.01)

(58) Field of Classification Search
CPC ..... H04W 52/34; H04W 24/10; H04W 52/36; H04W 88/085
See application file for complete search history.

(56) References Cited

U.S. PATENT DOCUMENTS

| | | |
|---|---|---|
| 6,373,909 B2 | 4/2002 | Lindquist et al. |
| 6,622,044 B2 | 9/2003 | Bange et al. |
| 7,024,680 B2 | 4/2006 | Howard |
| 7,106,781 B2 | 9/2006 | Agee et al. |
| 7,133,686 B2 | 11/2006 | Hundal et al. |
| 7,269,151 B2 | 9/2007 | Diener et al. |
| 7,457,295 B2 | 11/2008 | Saunders et al. |
| 7,656,897 B2 | 2/2010 | Liu |
| 7,822,105 B2 | 10/2010 | Underbrink et al. |

(Continued)

FOREIGN PATENT DOCUMENTS

EP    3035063 A1    6/2016

OTHER PUBLICATIONS

Anritsu Company, MT1000A MU100040A/MU100040B Network Master Pro Operation Manual, First Edition, Aug. 2017.

(Continued)

*Primary Examiner* — Jae Y Lee
(74) *Attorney, Agent, or Firm* — Isabelle Chabot

(57) ABSTRACT

A method comprising obtaining, via a test system, data from one or more tests of a mobile network having at least one antenna, wherein the data includes a stream of RF samples captured over-the-air or from a Common Public Radio Interface (CPRI) or enhanced CPRI (eCPRI) link; processing the data to detect peaks; performing an analysis of any detected peaks to identify any issues on the mobile network, the analysis including determining a relative power of the detected peaks; and causing display of a user interface that includes a reporting of any the relative power. Determining a relative power includes obtaining a baseline of a subset of the data and comparing an absolute power of the peak to the baseline.

18 Claims, 15 Drawing Sheets

(56) References Cited

U.S. PATENT DOCUMENTS

| | | |
|---|---|---|
| 7,860,193 B2 | 12/2010 | Gupta |
| 7,986,922 B2 | 7/2011 | Glazko et al. |
| 8,027,643 B2 | 9/2011 | Osterling et al. |
| 8,144,824 B2 | 3/2012 | Vrcelj et al. |
| 8,295,380 B2 | 10/2012 | Zhu et al. |
| 8,320,433 B2 | 11/2012 | Wegener |
| 8,428,203 B1 | 4/2013 | Zortea et al. |
| 8,649,388 B2 | 2/2014 | Evans et al. |
| 8,694,306 B1 | 4/2014 | Short et al. |
| 9,014,052 B2 | 4/2015 | Gravely et al. |
| 9,071,343 B2 | 6/2015 | Abdelmonem |
| 9,083,567 B2 | 7/2015 | Shi et al. |
| 9,125,054 B2 | 9/2015 | Ryan |
| 9,276,605 B2 | 3/2016 | Xia et al. |
| 9,277,424 B2 | 3/2016 | Garcia |
| 9,288,683 B2 | 3/2016 | Garcia et al. |
| 9,385,780 B2 | 7/2016 | Alloin et al. |
| 9,941,959 B2 | 4/2018 | Heath et al. |
| 9,979,600 B2 | 5/2018 | Shor et al. |
| 10,009,784 B1 | 6/2018 | Evircan |
| 10,067,171 B2 | 9/2018 | O'Keeffe et al. |
| 10,069,607 B2 | 9/2018 | Shor et al. |
| 10,158,389 B2 | 12/2018 | Gale et al. |
| 10,237,765 B1 | 3/2019 | Bradley |
| 10,476,589 B2 | 11/2019 | Heath et al. |
| 2013/0045705 A1 | 2/2013 | Kapoor |
| 2013/0115904 A1 | 5/2013 | Kapoor |
| 2014/0323058 A1 | 10/2014 | Carbajal |
| 2015/0358928 A1 | 12/2015 | Dural et al. |
| 2016/0277050 A1 | 9/2016 | Kato |
| 2017/0237484 A1* | 8/2017 | Heath ............... H04B 1/1027 398/26 |
| 2017/0245162 A1 | 8/2017 | Beck et al. |
| 2017/0294928 A1 | 10/2017 | Gale et al. |
| 2017/0317717 A1* | 11/2017 | Trojer ............... H04B 3/46 |
| 2017/0353929 A1 | 12/2017 | Tacconi et al. |
| 2018/0070254 A1 | 3/2018 | Hannan et al. |
| 2018/0081047 A1 | 3/2018 | Gander |
| 2018/0248576 A1 | 8/2018 | Coe et al. |
| 2018/0269923 A1 | 9/2018 | Chang et al. |
| 2018/0295553 A1 | 10/2018 | Abdelmonem |
| 2018/0323815 A1 | 11/2018 | Beadles |
| 2018/0359048 A1 | 12/2018 | Stephenne |
| 2018/0368077 A1 | 12/2018 | Laporte et al. |
| 2019/0052294 A1 | 2/2019 | Abdelmonem |
| 2019/0058534 A1 | 2/2019 | Anderson |
| 2019/0222243 A1 | 7/2019 | Abdelmonem |
| 2019/0326986 A1 | 10/2019 | Heath et al. |
| 2019/0386753 A1* | 12/2019 | Martel ............... H04B 10/071 |

OTHER PUBLICATIONS

Anritsu Company, Spectrum Master Compact Handheld Spectrum Analyzer, Aug. 2019, United States.

Signalcraft Technologies Inc., CPRI test done brilliantly and affordably, SC2820, SIQMA, CPRI Analyzer, Jun. 6, 2018.

Viavi Solutions Inc., CellAdvisor JD746B/JD786B RF Analyzers, 30176018 901 0316, 2016.

Viavi Solutions Inc., Increase RF Visibility with CPRIAdvisor, 30186095 900 0417, 2017.

Viavi Solutions Inc., Easy Remote Testing of Radiohead Operation with CPRI and OBSAI, 30173210 906 0317, 2017.

Blackard et al., Measurements and Models of Radio Frequency Impulsive Noise for Indoor Wireless Communications, IEEE Journal on Selected Areas in Communications, vol. 11, No. 7, Sep. 1993.

Huang et al., Wireless Spectrum Occupancy Prediction Based on Partial Periodic Pattern Mining, IEEE Transactions on Parallel and Distributed Systems 25, No. 7 (2013): 1925-193, Nov. 8, 2013.

Zhang et al., Compressed Impairment Sensing-Assisted and Interleaved-Double-FFT-Aided Modulation Improves Broadband Power Line Communications Subjected to Asynchronous Impulsive Noise, IEEE, 10.1109/Access.2015.2505676, Dec. 4, 2015.

Brian Weeden, Radio Frequency Spectrum, Interference and Satellites Fact Sheet, Secure World Foundation, Jun. 25, 2013.

Anritsu, Base Station Transmits: Test and Measurement, https://anritsu.typepad.com/basestationtransmits/test-and-measurement/, retrieved on Jun. 3, 2019.

Murali et al., Design of Nano Base Stations for Future Broad Band Applications, International Journal for Modem Trends in Science and Technology, vol. 2, Special Issue 01, Oct. 2016.

ORF Intelligent OpticalRF, User Guide [online]. EXFO, Nov. 1, 2019 version: 3.0.0.3, [retrieved on Dec. 3, 2019] <URL: https://www.exfo.com/fr/ressources/documents-techniques/user-manuals/iorf/>.

* cited by examiner

| | | |
|---|---|---|
| Summary | Analysis ⑨ | CPRI Link |

◉ Potential Internal PIM detected on AxC 13

○ Potential Interferer (86.91dB) detected at -1.040 MHz on AxC 10.

○ Potential idendical Interferer at 1.040 MHz detected on AxC 1, AxC 13

○ Potential Interferer (60.25dB) detected at 0.000 MHz on AxC 0.

○ Potential idendical Interferer at -1.560 MHz detected on AxC 4, AxC 9

○ Potential Interferer (33.46 dB) detected at -2.090 MHz on AxC 2.

○ Potential idendical Interferer at 1.001 MHz detected on AxC 0, AxC 1, AxC 2, AxC 3, AxC 4, AxC 5, AxC 6, AxC 7, AxC

FIG. 7A

| Summary | Analysis ③ | | CPRI Link | |
|---|---|---|---|---|
| AxC | CF (MHz) | BW (MHz) | PIM (dB) | Peaks |
| 0 | 0.000 | 10 | 11 | 2    Hide Peaks ⌃ |

| | Num | Frequency (MHz) | Relative Power (dB) | Power (dB) |
|---|---|---|---|---|
| ○ | 1 | -2.000 | 12.15 | -2.91 |
| ○ | 2 | 0.000 | 14.10 | -3.73 |

FIG. 10C

AUTOMATED NARROW PEAK INTERFERENCE SEVERITY ESTIMATION

CROSS-REFERENCE TO RELATED APPLICATIONS

The present disclosure claims priority to U.S. Provisional patent Application No. 62/944,142, filed Dec. 5, 2019, and U.S. Provisional patent application No. 63/011,621, filed Apr. 17, 2020, the contents of each are incorporated by reference herein.

TECHNICAL FIELD

The present disclosure generally relates to network testing. More particularly, the present disclosure relates to systems and methods for automated analysis of Radio Frequency (RF) spectrum, namely for automated narrow peak interference severity estimation.

BACKGROUND

Mobile network operators (MNOs) can locate RF interference issues in mobile networks using real-time, high-resolution RF spectrum analysis. Once the RF spectrum is captured, technicians can quickly and accurately identify critical interference issues such as external RF interference and internal and external Passive Intermodulation (PIM). The RF spectrum is a stream of RF samples which is captured over-the-air or, in the case of fiber-based transport, over CPRI (Common Public Radio Interface) or enhanced CPRI (eCPRI). CPRI is a standard that defines an interface between Radio Equipment Controllers (REC) and Radio Equipment (RE). CPRI allows the replacement of copper or coaxial cables between a radio transceiver and a base station, such as via fiber. Note, the term CPRI is used herein to represent CPRI as well as eCPRI and other variants.

EXFO's OpticalRF™ application provides access to the RF signal through the digital CPRI link available at the base station, located at the bottom of the cell tower or kilometers away as in a Centralized Radio Access Network (C-RAN) architecture.

The detection of interferers in RF spectrum is a common task carried out by technicians in the field. Interference appears in spectrum as persisting peaks, either narrow or wide peaks. The more powerful ones show up on an RF spectrum in just about any conditions. Other peaks are subtle and require careful tuning of the RF spectrum analysis equipment. An experienced technician will be able to adjust the Resolution Bandwidth (RBW), the Video Bandwidth (VBW), as well as other parameters to emphasize the particular interference being hunted for. The OpticalRF™ (ORF) application provides technicians with the speed, granularity, and clarity to identify what issues are present. ORF is a digital spectrum analyzer that extracts its information from a CPRI link instead of an analog coaxial cable. It can be used by mobile operators to measure/troubleshoot cell towers. ORF has various controls available in a spectrum analyzer: RBW, VBW, Center Frequency, Span, etc. To operate such an instrument, the user must be well trained and experimented, such as an RF expert. Mobile operators have a shortage of qualified personnel to operate such instruments.

Conventional analysis approaches can integrate some version of automated measurement, but this always revolves around the manipulation and visualization of a spectrum trace. Some devices automatically put markers on the trace with numbers on it; others put the measurements in a table next to the trace and so on. All this information centers around a spectrum trace, and this is overwhelming to a non-expert technician. As more and more antennas are installed, there is a shortage of skilled and experienced technicians able to analyze RF spectrum to find interference and other states of the antenna.

EXFO's iORF™ (Intelligent OpticalRF) application is an intelligent RF over CPRI application that auto-configures the analysis of the CPRI link as soon as a fiber is inserted and auto-detects the mapping of the antenna connected to the Radio Head. Specifically, iORF provides RF spectrum analysis over CPRI. Note, while described herein with respect to iORF, those skilled in the art will recognize any RF spectrum analysis device is contemplated. Once the test is started, an automated analysis of the selected antennas provides a clear indication of what issues are troubling the sector and whether it is RF interference, internal or external PIM. For each Antenna Carrier (AxC), the located peaks corresponding to interferers on the network are identified and are listed with their frequency (e.g., in MHz) and peak power (e.g., in dB). Peaks are often sorted on peak power to emphasize the interferences with the highest absolute power.

It has been found that the severity of the impact of the interferers is not solely related to their absolute or peak power. Therefore, sorting the peaks using their peak power does not always yield a list sorted by severity. In fact, other issues on the network, such as PIM, may hide the interferer's real severity. As technicians are pressed for time and need to determine what actions to take first to troubleshooting the network, an incorrect sorting of the severity of the interferers can be damaging to network operation, i.e., providing the wrong priorities.

There is, therefore, a need to compare narrow peaks in an RF spectrum to determine a relative severity of interferers and allow sorting by severity to facilitate the work, i.e., troubleshooting a cell tower, of the technician who is not an RF expert.

SUMMARY

According to one broad aspect, there is provided a method comprising obtaining, via a test system, data from one or more tests of a mobile network having at least one antenna, wherein the data includes a stream of Radio Frequency (RF) samples captured over-the-air or from a Common Public Radio Interface (CPRI) or an enhanced CPRI (eCPRI) link; processing the data to detect peaks; performing an analysis of any detected peaks to identify any issues on the mobile network, the analysis including determining a relative power of the detected peaks with said relative power used to assign a severity estimation; and causing display of a user interface that includes a reporting of the relative power and the severity estimation with the user interface.

In one embodiment, determining a relative power includes obtaining a baseline power of a subset of the data and comparing an absolute power of the peak to the baseline power.

In one embodiment, obtaining the baseline power includes modeling the baseline power for the subset of data, the modeling including performing one of a linear regression and an average on the subset of the data to determine a baseline power function.

In one embodiment, the baseline power function is a constant.

In one embodiment, the subset of the data is all of the data.

In one embodiment, obtaining the baseline further comprises averaging multiple samples of the subset of the data to obtain an average subset data set on which to perform the modeling.

In one embodiment, the subset of the data is an occupied bandwidth of the data and obtaining the baseline further comprises filtering the subset of data to extract data pertaining to the occupied bandwidth.

In one embodiment, performing the analysis of detected peaks further includes sorting the detected peaks in order of the relative power to assign a relative severity estimation.

In one embodiment, causing the display further includes a ranking of spectrum interferers by antenna based on the severity estimation. For any two spectrum interferers, a higher severity estimation is given to a peak with a higher relative power therebetween. The display can include at least one spectrum interferer having a higher absolute power than another one spectrum interferer but ranked lower based on the severity estimation due to relative power.

In one embodiment, processing the data further includes performing Fast Fourier Transforms on said data and filtering based on an occupied bandwidth/

According to another broad aspect, there is provided a test system comprising: a detector configured to capture a stream of RF samples over-the-air or through connection to a Common Public Radio Interface (CPRI) link or enhanced CPRI (eCPRI) link; a processor; and memory storing instructions that, when executed, cause the processor to perform the steps of the method.

According to another broad aspect, there is provided a non-transitory computer-readable storage medium having computer-readable code stored thereon for programming a test system to perform the steps of the method.

In an embodiment, a non-transitory computer-readable storage medium has computer-readable code stored thereon for programming a test system to perform the steps of obtaining data from one or more tests of a mobile network having at least one antenna, wherein the data includes a stream of RF samples captured over-the-air or from a Common Public Radio Interface (CPRI) link; processing the data to detect peaks; performing an analysis of any detected peaks to identify any issues on the mobile network; and causing display of a user interface that includes a reporting of the relative power.

In another embodiment, a test system includes a detector configured to capture a stream of RF samples over-the-air or through connection to a Common Public Radio Interface (CPRI) link; a processor; and memory storing instructions that, when executed, cause the processor to obtain data from one or more tests of a mobile network having at least one antenna, wherein the data includes a stream of RF samples captured over-the-air or from a Common Public Radio Interface (CPRI) link; process the data to detect peaks; perform an analysis of any detected peaks to identify any issues on the mobile network; and cause display of a user interface that includes a reporting of the relative power.

In a further embodiment, a method includes obtaining data from one or more tests of a Common Public Radio Interface (CPRI) link, wherein the data includes samples for selected Antenna Carriers (AxC) on the CPRI link; processing the data to detect peaks on any of the selected AxCs on the CPRI link; performing an analysis of any detected peaks to identify any issues on the CPRI link; and causing display of a user interface that includes a reporting of any identified issues with the user interface including a tabular display of the identified issues and a spectrum graph.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 includes FIG. 3A and FIG. 3B in which

FIG. 7 includes FIG. 7A and FIG. 7B in which FIG. 7A is a screenshot of a user interface to display a list of issues detected on the network, sorted by order of severity with simulated and exaggerated displayed values

FIG. 8 includes FIG. 8A and FIG. 8B in which

FIG. 10 includes FIG. 10A, FIG. 10B and FIG. 10C in which FIG. 10C is a screenshot of a user interface to display a tabular representation of the frequency, relative power and absolute power of detected peaks of FIG. 10A.

DETAILED DESCRIPTION

The present disclosure relates to systems and methods for automated analysis of Radio Frequency (RF) spectrum, namely for automated narrow peak interference severity estimation. Specifically, the systems and methods include the automatic configuration and detection of issues on a single trace or correlated traces with contextual reporting to a user. The objective is automated analysis and reporting enabling non-expert user interaction. The systems and methods include minimal configuration by the user, i.e., parameters are automatically tuned for the measurement in progress. The systems and methods perform automatic measurement of key parameters, detect the presence of interferers, identify interferers, and present those results is an easily understandable format, such as a tabular and text form. The trace is also presented.

When comparing interferers present on multiple antenna power spectrums that possess different characteristics and which have been distorted by network issues, the user would currently be required to perform manual visual determinations based on the apparent characteristics of each peak individually. These determinations would be performed for each antenna and then, in some cases, ranked in the level of severity. This method of manual determination for each interferer would be subject to fluctuations in the underlying data due to the nature of transmitted signals. These manual determinations could also result in individuals ranking the severity of spectrum interferers incorrectly or differently.

Figure 1:
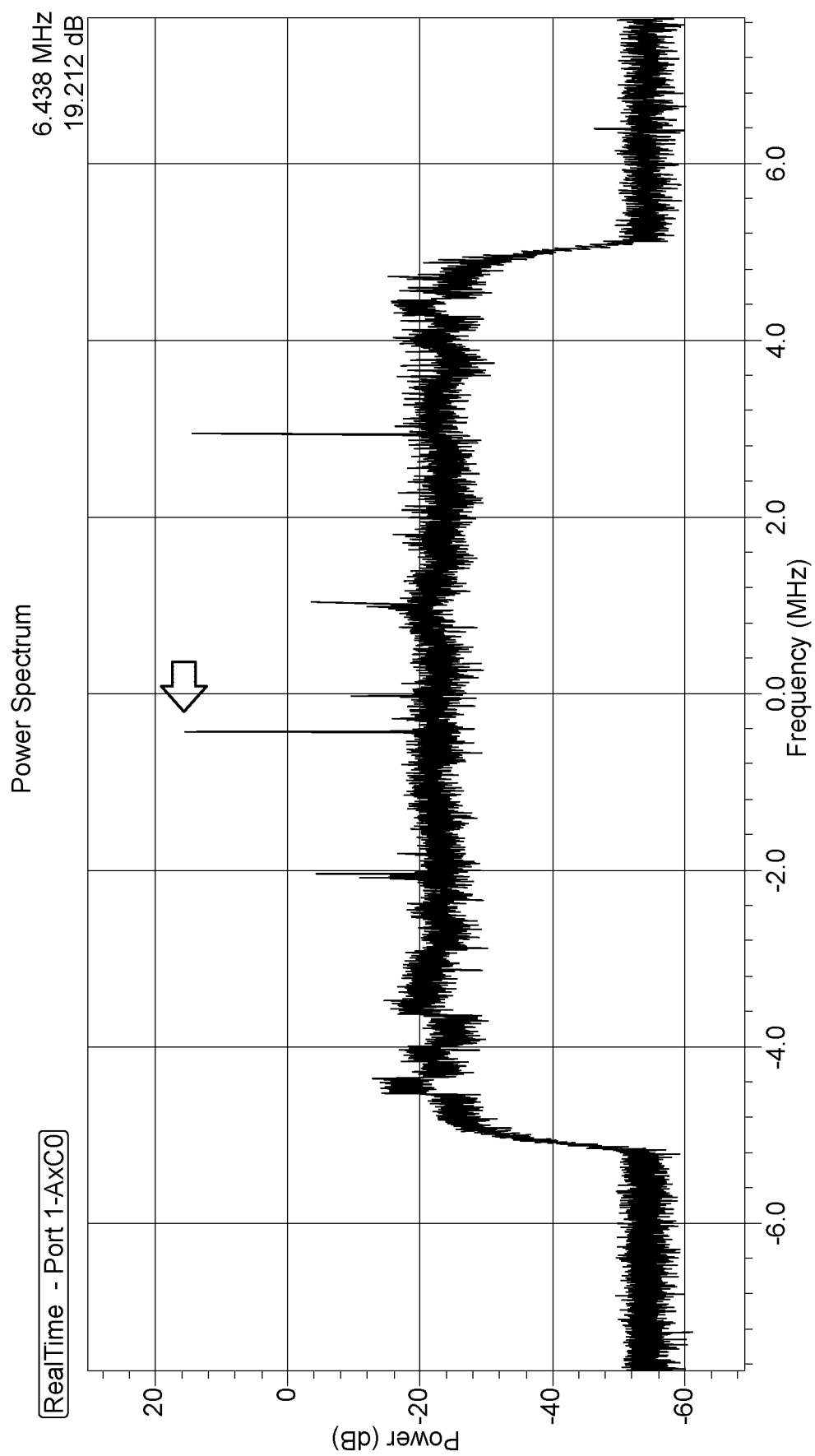
FIG. 1 is a screenshot of a user interface to display a spectrum trace on which an example spectrum is shown, the example spectrum having a peak identified by an arrow with an absolute power of 17 dB.
Figure 2:
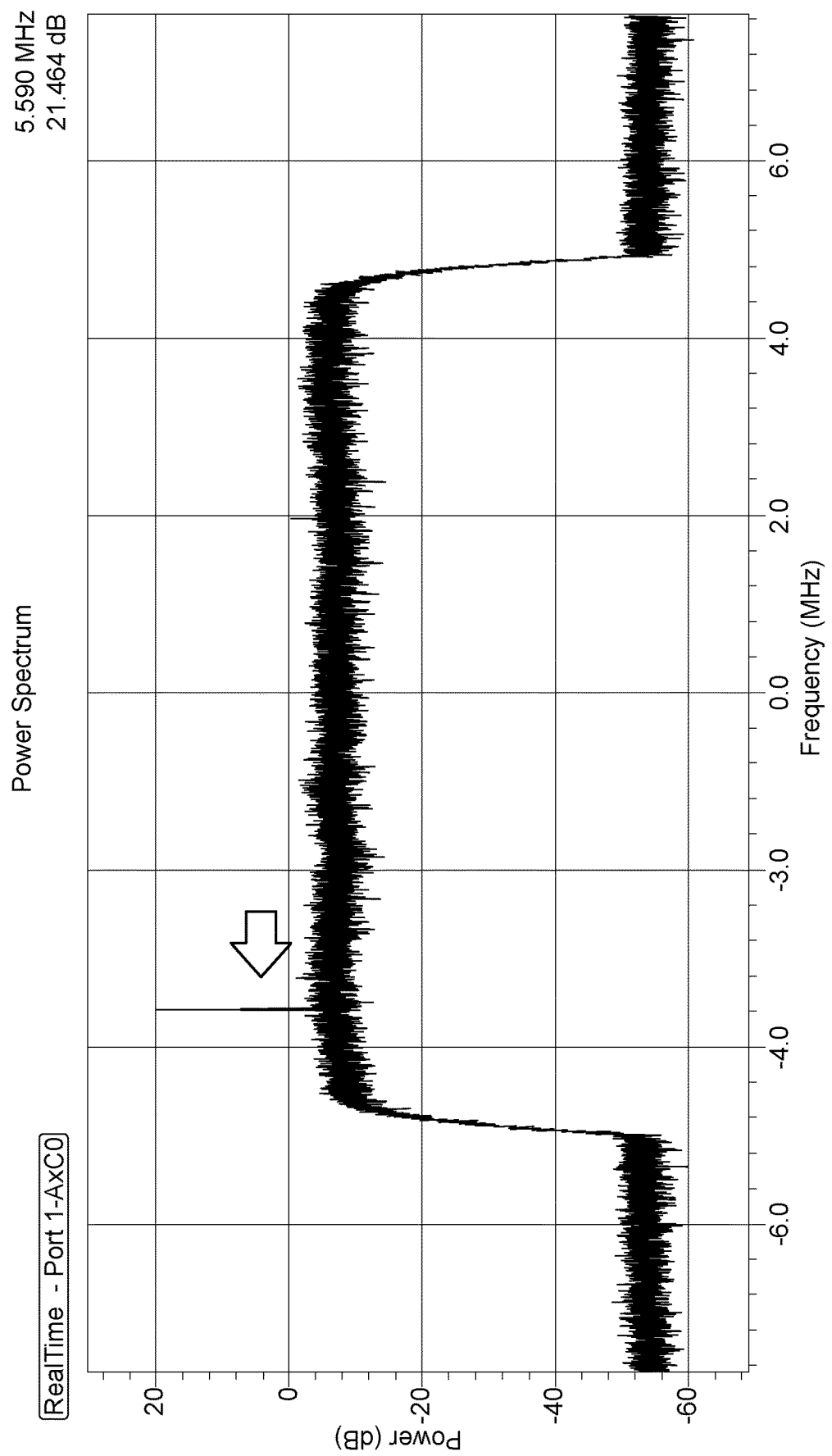
FIG. 2 is a screenshot of a user interface to display a spectrum trace on which an example spectrum is shown, the example spectrum having a peak identified by an arrow with an absolute power of 20 dB.

FIGS. 1 and 2 give a practical example to better explain the limitations of the current peak power value. FIG. 1 shows a power spectrum displayed in the iORF application. An arrow points to an interferer of interest. Its peak or absolute power is about 17 dB. FIG. 2 shows another power spectrum. The only interferer has a peak or absolute power of 20 dB. When comparing both interferers using the peak or absolute power, one could conclude, erroneously, that the interferer of FIG. 2 is more severe than that of FIG. 1.

Figure 3A:
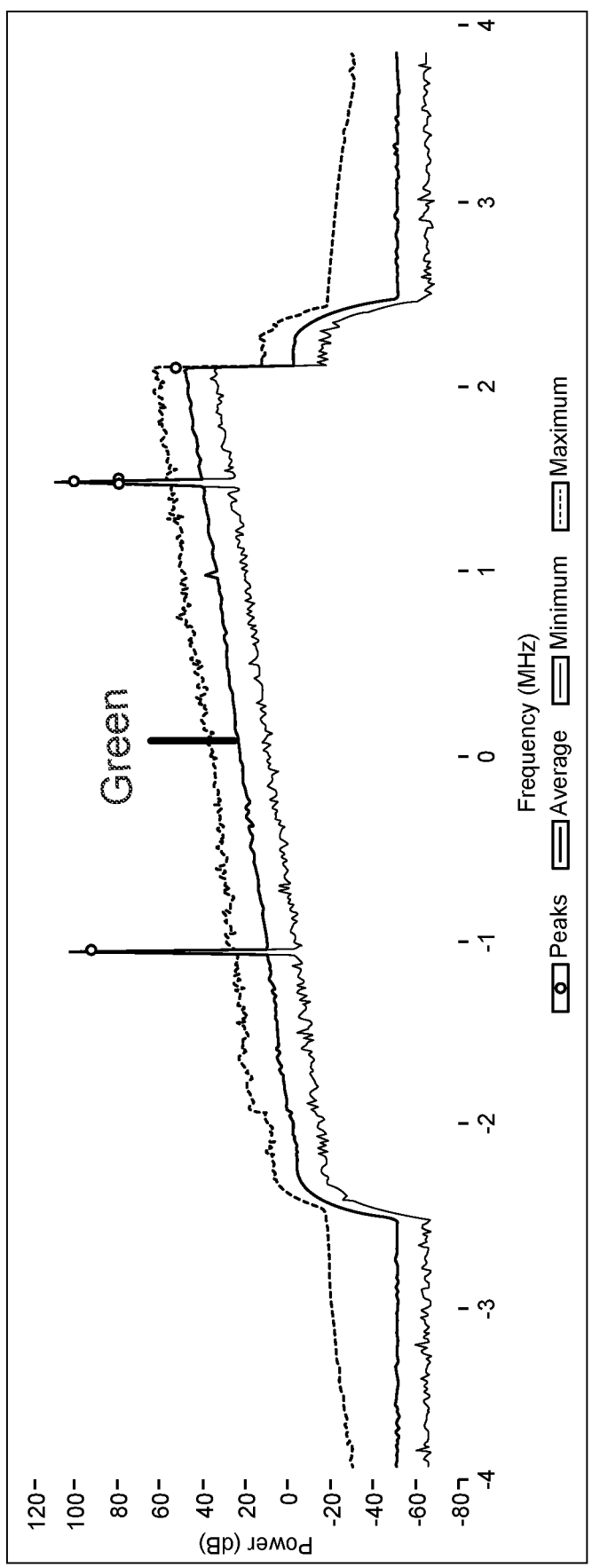
FIG. 3A is a screenshot of a user interface to display spectrum traces on which a simulated spectrum suffering from exaggerated PIM and narrow interference peaks is shown with its minimum trace, its maximum trace, its average trace and its detected peaks

FIG. 3A shows a simulated example in which there is an exaggerated PIM issue as well as exaggerated narrow peaks for illustration purposes. Peaks 1 and 3 have a similar absolute power. However, peak 1 is actually stronger because of the slope of the spectrum affected by PIM. Comparing the absolute value of the peaks present in the same signal that is experiencing a PIM that distorts the shape of the spectrum may not serve to represent the real interferer severity.

The problem to be solved here is the automatic determination of the signal level function, or baseline power function, to allow a relative power calculation. In general terms, the relative power corresponds to the absolute power compared to the value of the baseline power function at the frequency of the peak. This can, in turn, automate the process of determining the severity of a peak and rank them from most severe to least severe. This automatic determination should not be based on the skill of the technician for reading the power spectrum. It should consider that other RF issues can affect the signal shape. It should also allow comparison regardless of the configuration.

Determining a baseline power function for the spectrum is the problem to solve. Determining proper reference points in the spectrum is the primary challenge. Powerful interferences make finding proper reference points difficult due to their ability to distort spectrum power levels.

The present system determines that the signal of FIG. 1 has a signal level, or baseline power, of −20 dB and calculates that the interferer's relative power is 37 dB by subtracting the baseline power from the absolute power. Using the same logic, the interferer of FIG. 2 has a relative power of about 23 dB since its signal has a baseline power of −3 dB. A more precise appreciation of the severity (importance or relevance) of the peak is therefore that the interferer of FIG. 1 is more severe and, if addressed and solved first by skilled technicians, would have a greater impact on the improvement of the quality of the RF signal.

Figure 3B:
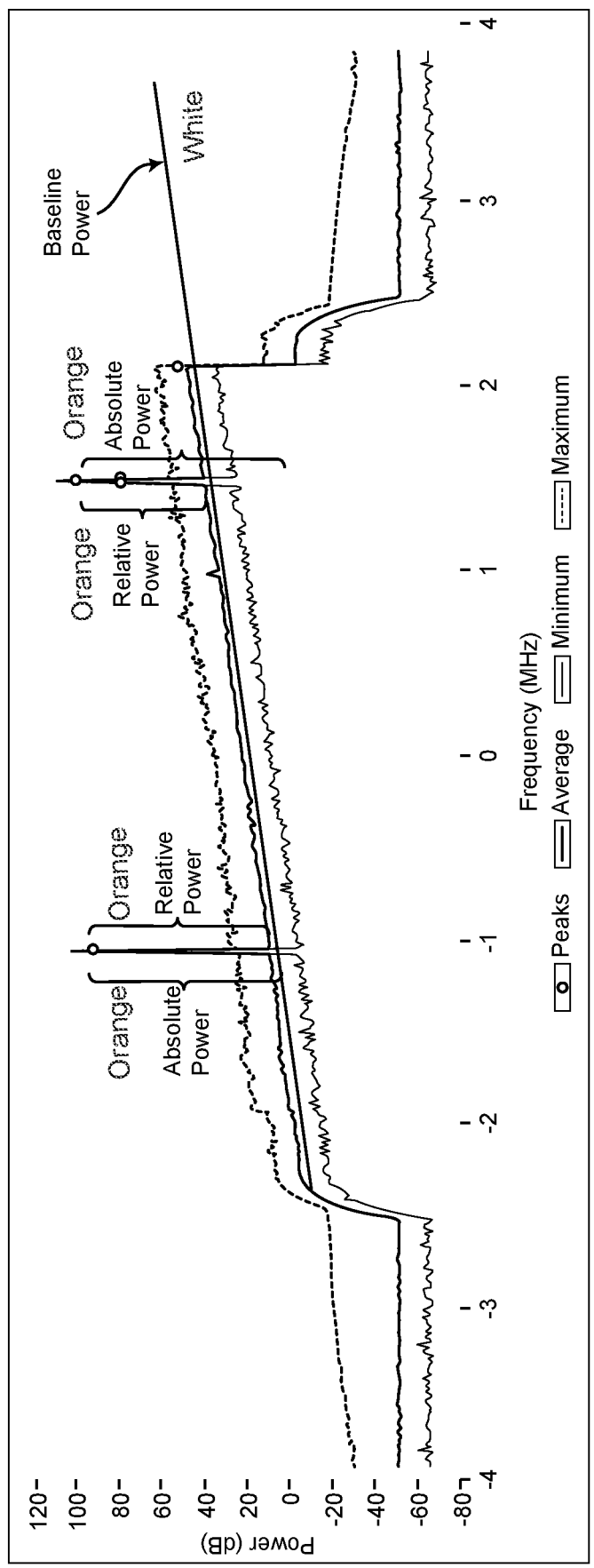
FIG. 3B is the screenshot of FIG. 3*a* on which are superimposed an approximate baseline power level and the absolute and relative power of its major detected peaks.

On the simulated spectrum of FIG. 3B, an approximate baseline power function is shown in white, and the absolute and relative power of both peaks is shown using orange brackets.

Figure 4:
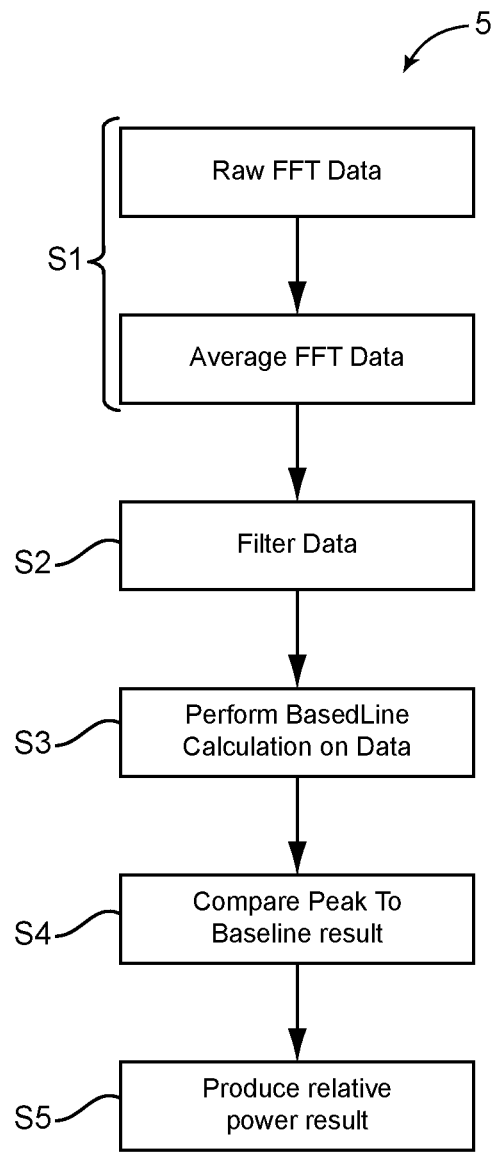
FIG. 4 is a flow chart of example main steps of a method for determining the relative power of detected peaks.

Referring now to FIG. 4, a flow chart of main steps of an example method 5 for determining a relative power value for the peaks is shown. The method comprises five steps as follows.

Step S1: Take raw Fast Fourier Transform (FFT) Data and perform an average over multiple FFTs to have a proper set of data that does not fluctuate rapidly based on carrier activity. For example, an average of 16 FFTs can be used. This value is configurable. It can represent, for example, multiple seconds of data. These multiple snapshots of the full spectrum in time allow to minimize fluctuations caused by carrier activity which should be ignored in order to determine the baseline power level of the spectrum. The result of Step S1 is an average signal output which was never actually captured by the system, but which represents a stable basis to perform the baseline power level calculation.

Step S1 could be omitted if one is willing to have the baseline calculation potentially affected by carrier activity. The difference in the resulting baseline calculation may be negligible depending on the nature of the signal.

Step S2: Perform filtering on this averaged data. Filtering may include two sub-steps: a) remove values that are not present in the occupied bandwidth of a signal spectrum and b) decimate points per bin to optimize the baseline calculation.

The occupied bandwidth is calculated using the Long-Term Evolution LTE or Universal Mobile Telecommunications Service (UMTS) specifications. The signal bandwidth, occupied subcarrier count, FFT size, and oversample of the signal are used to determine the points that will be filtered out. Equation 1 provides the percentage of the spectrum, which contains the transmitted data. Data not present in this percentage on both sides of the spectrum are omitted.

$$\frac{\left(\text{subcarrier}\frac{\text{count}}{FFT}\right)*}{\text{specification oversample}*ChipRate} = \text{Utilized } BW \text{ Factor} \qquad \text{Equation 1}$$

For example, if a 10 Mhz signal has an occupied subcarrier amount of 601 and an FFT size of 1024, this means that (601/1024)*100~=59% for the basic case. The percentage can be adjusted depending on the oversample allowing to determine the occupied bandwidth of different extraction and sample types.

Figure 5:
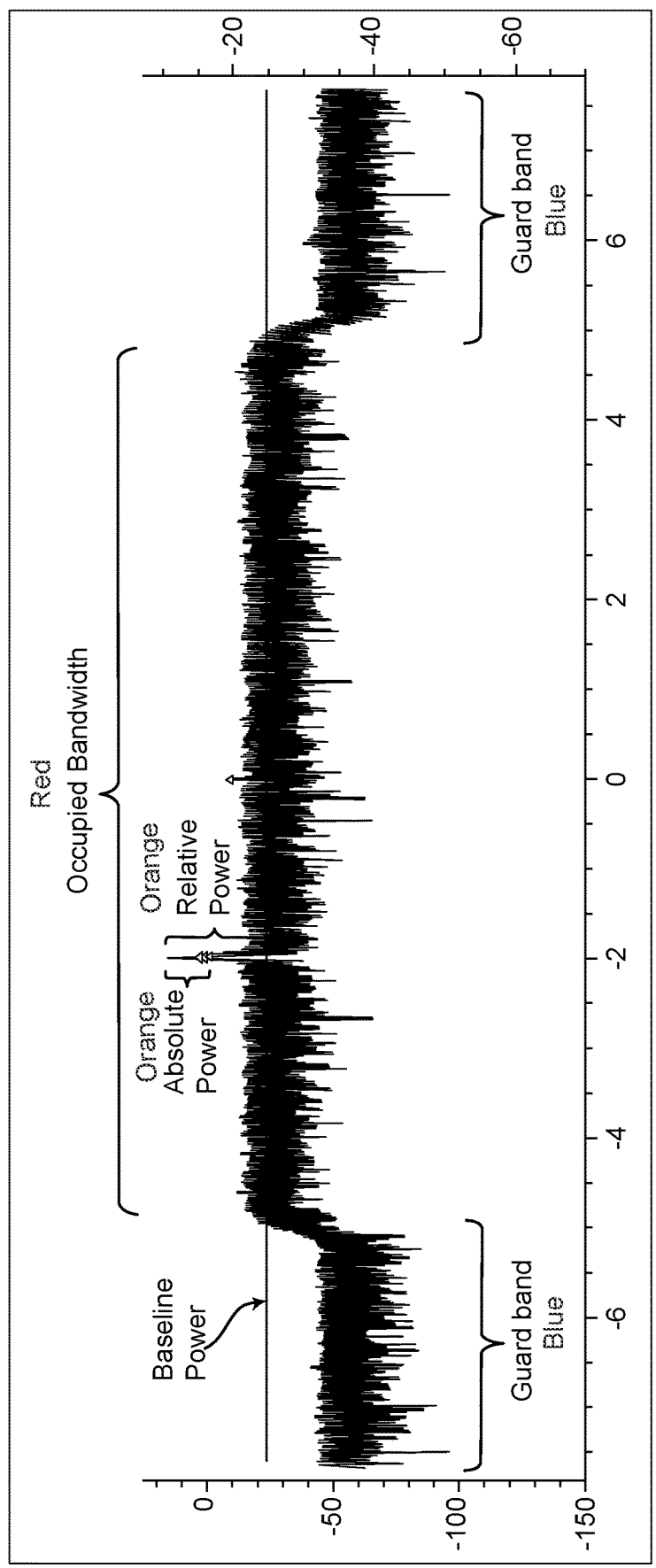
FIG. 5 shows an example spectrum including its occupied bandwidth, its guard bands, its baseline power level and the absolute and relative power of its major detected peak.

FIG. 5 shows an example spectrum including its occupied bandwidth, its guard bands, its baseline power level and the absolute and relative power of its major detected peak. The example occupied bandwidth is shown with a red bracket. If step S2a is omitted, the guard bands on each side of the occupied bandwidth (shown with blue brackets) will be considered in the determination of the baseline power, which will typically yield a baseline power level lower than the actual baseline power.

The optimization of the baseline calculation can vary based on resolution bandwidth, namely FFT size and size of the bins. For example, if we decide to use a kHz bin size for a 5 MHz signal, about 4-5 points per bin will be used. If we use a bin size of a MHz, it would be 4300-5000 points per bin when using an FFT size of 32768 points. As will be readily understood, step S2*b* can be omitted.

Referring back to FIG. 4, Step S3: Perform a mathematical calculation on the filtered data to compute the baseline power level of the data set. Example calculations include an average or linear regression of the points. Linear regression is the act of linearizing a distributed data set. It yields a function defined by y=ax+b. Linear regression has the added advantage of negating the effect of PIM, if present in the data set. Example linear regression algorithms include least-squared linear regression and linear absolute deviation (LAD) regression. Step S3 yields a baseline value (simple average) or a relative baseline of the data set which is a linear function (linear regression). Inserting an array index in the x value of the relative baseline function calculates an appropriate y value of the baseline for that index. An example baseline level (simple average) is displayed in green in the example spectrum of FIG. 3A. An example baseline power function (linear regression) is displayed in white in the example spectrum of FIG. 3B. Other techniques could be used. For example, one could first filter out the peaks and some spikes using spike filtering and could then perform an average over the filtered signal. Spike filtering would involve identifying large power and short duration spikes.

Step S4: Compare the peak absolute power to the relative baseline absolute power. The comparison can be done in Watts or in dB. The relative power in dB is the ratio between the absolute Peak Power divided by the baseline power in Watts converted to dB or the subtraction of peak absolute power in dB by baseline power in dB. This comparison can be a ratio of peak absolute power over baseline power. Baseline power is a value in Watts. Example Absolute and Relative powers are displayed in orange in the example spectrums of FIG. 3B and FIG. 5.

Figure 6:
FIG. 6 is a screenshot of a user interface to display a tabular representation of the frequency, relative power and absolute power of detected peaks with simulated and exaggerated displayed values.

Step S5: Return the relative power value. The absolute peak power and/or the relative peak power can be displayed to the user on a user interface of the system. In the example shown in FIG. 6, a list of all detected peaks in the spectrum of FIG. 3 is provided with the center frequency at which the peak appears (MHz), the absolute peak power (dB) and the relative peak power (dB). In this example, the peaks are numbered sequentially in order of frequency of appearance.

Additionally, the peaks can then be sorted from highest relative power to lowest relative power in a table of issues found on the network, therefore assigning a higher severity level to a peak with a higher relative power. Other sorting schemes may also take into account the absolute power and/or the center frequency of the peak in addition to the relative power. As will be readily understood, when considering issues other than narrow peak interferers, one may choose to list a PIM issue as having a higher severity than the most severe narrow peak interferer.

Figure 7B:
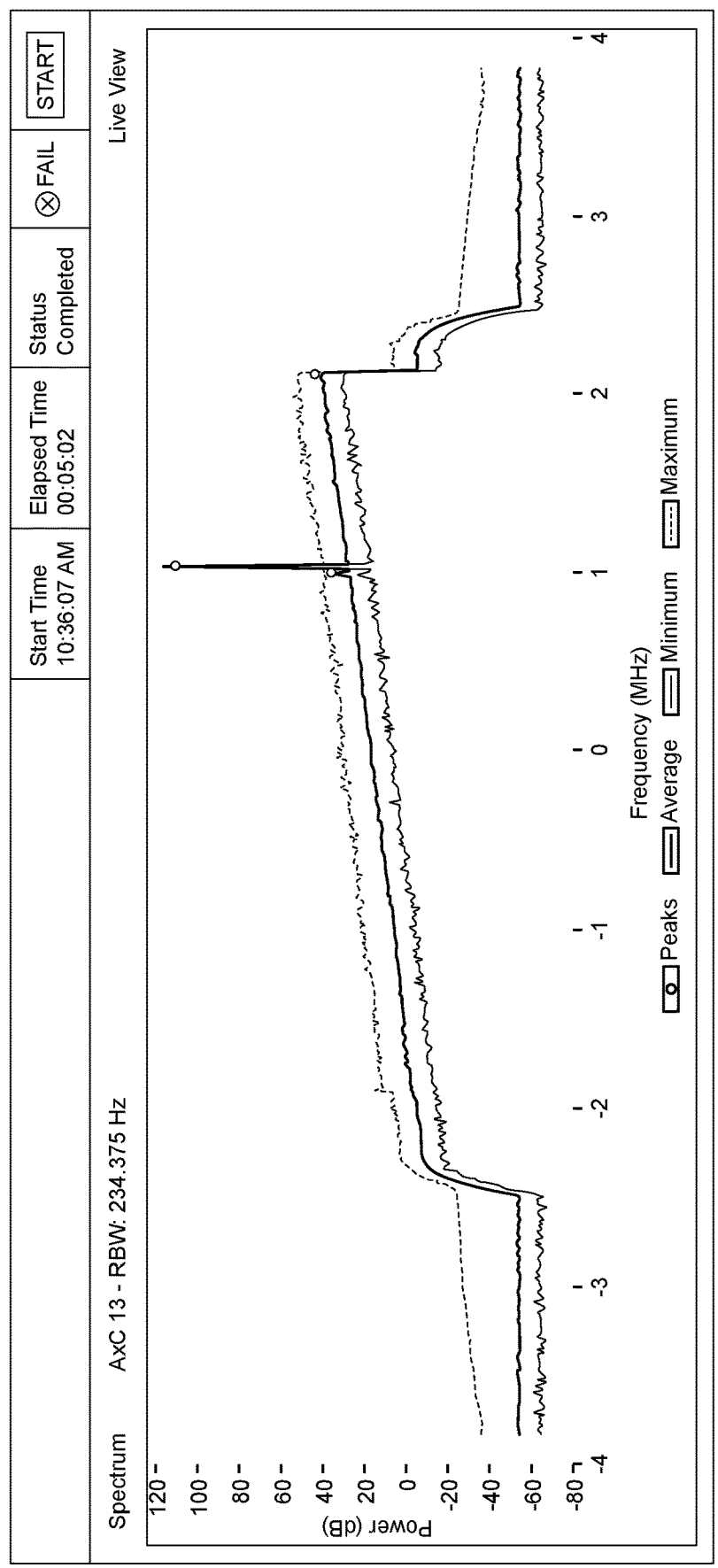
FIG. 7B is a screenshot of a user interface to display the spectrum relevant to the highlighted issue of FIG. 7A, on which the displayed spectrum is simulated and suffering from exaggerated PIM and narrow interference peaks.

FIG. 7 includes screenshots of an example interface for displaying information about issues detected on the network. FIG. 7A shows a list of detected network issues sorted based on their severity and taking into account all AxCs. The most severe issue, an internal PIM issue, is selected. FIG. 7B shows the selected spectrum (AxC 13) with multiple detected issues, including the internal PIM listed as the most severe issue in FIG. 7A and a few narrow peak interferers. In this example, the interferer detected at 1.040 MHz on AxC 13 is not as severe as the interferer detected at −1.040 MHz on AxC 10 (86.91 dB).

This solution provides an automated way of comparing interferers between different antenna spectrums and within the same antenna spectrum. This automation discards time-sensitive data fluctuation and provides a reliable method for comparing interferers between antenna with different spectrum characteristics.

This algorithm ignores the appearance of interferences and PIM in a power spectrum and can easily determine the baseline power level. It provides a standard baseline that is taken throughout the occupied bandwidth of a spectrum allowing for any point that lies within that occupied bandwidth to be compared correctly with another. The factor of carrier activity is also removed from consideration since this solution performs an average over multiple seconds of FFT Data. If a user were to manually compute this calculation it is possible carrier activity would make it difficult to find a proper baseline.

In an alternative embodiment, one could apply a median filter over the occupied bandwidth. This method is less robust because wideband interferers will have an impact on the median.

As will be readily understood, it would be possible to calculate a baseline for the guard bands of the spectrum using the same technique but by filtering out the occupied bandwidth of the signal. This could be used to determine the relative severity of issues which are detected in that section of the spectrum.

In an alternative embodiment, one could add a step of downsampling the signal and performing an average on multiple downsampled signals. For example, 100 downsampled signals could be used. Using a leaky integrator method or algorithm of the sort, the average of the multiple traces could be computed. This would, in turn, allow for a reduction of the memory resources and computational resources required to perform the related calculations.

Test System

Figure 8A:
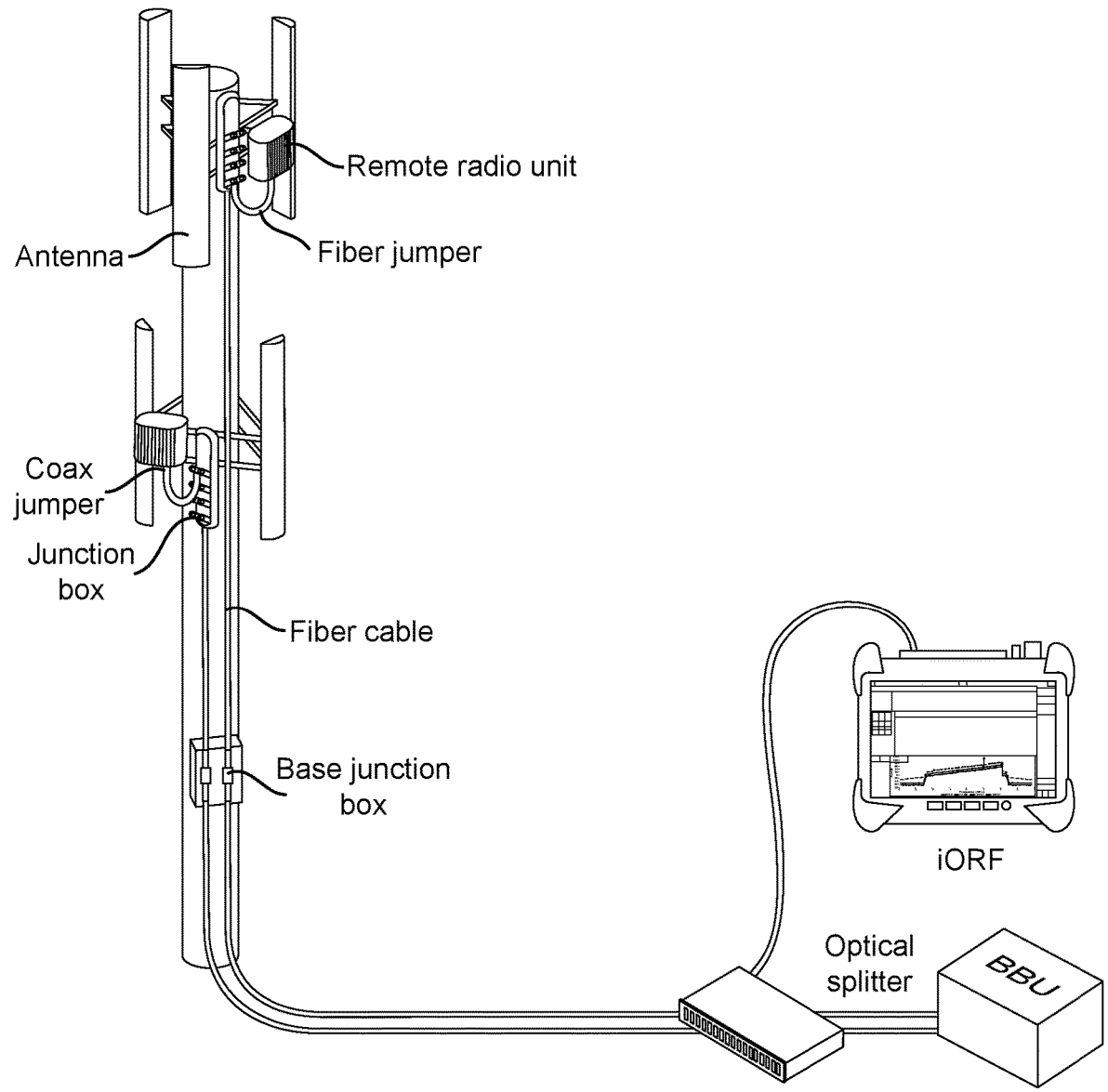
FIG. 8A is a schematic representation of a test system with an associated User Interface (UI) in a configuration for use with a CPRI link tap and FIG. 8B is a schematic representation of an alternative test system with an associated User Interface (UI) in a configuration for use in an over-the-air capture of RF data.

FIG. 8A shows a test system 10 for a fiber-based network labelled iORF with an associated User Interface (UI). The test system is connected to a CPRI link via a tap or optical splitter. For example, the CPRI link can be a fiber connection between a Remote Radio Head (RRH) on a cell tower and a Baseband Unit (BBU). The tap can be an optical power tap that provides a portion of the optical power on the CPRI link to the test system for analysis thereof.

An AxC within the CPRI link is an Antenna Carrier. It is a portion of the CPRI link where IQ samples of a particular antenna are transported. For the untrained eye, it is difficult to provide an assessment of the quality of the CPRI link by looking at the spectrum trace in the UI. Experience is required to properly set the different parameters and values such as RBW, VBW, min trace, max trace, etc., on the test system. Furthermore, the user has to correlate interferences on multiple AxCs manually by bringing up multiple graphs and comparing them in order to identify interferers.

Figure 8B:
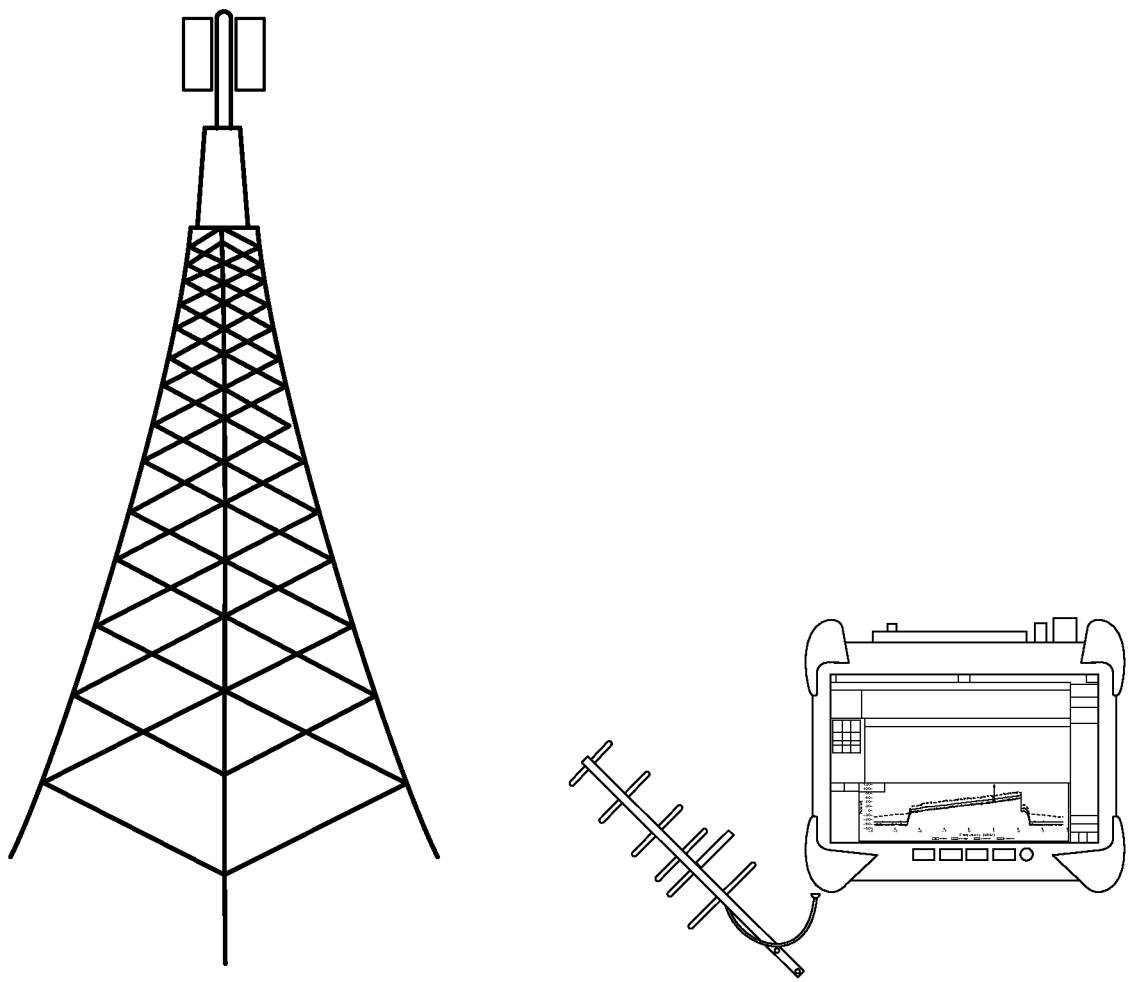

FIG. 8B shows an alternative test system that captures the streams of RF data over-the-air from the antenna. The test system is connected to a receiver antenna via a connector. The receiver antenna has an appropriate frequency range for the application. The receiver antenna receives and captures the stream of RF data emitted from the network antenna.

Figure 9:
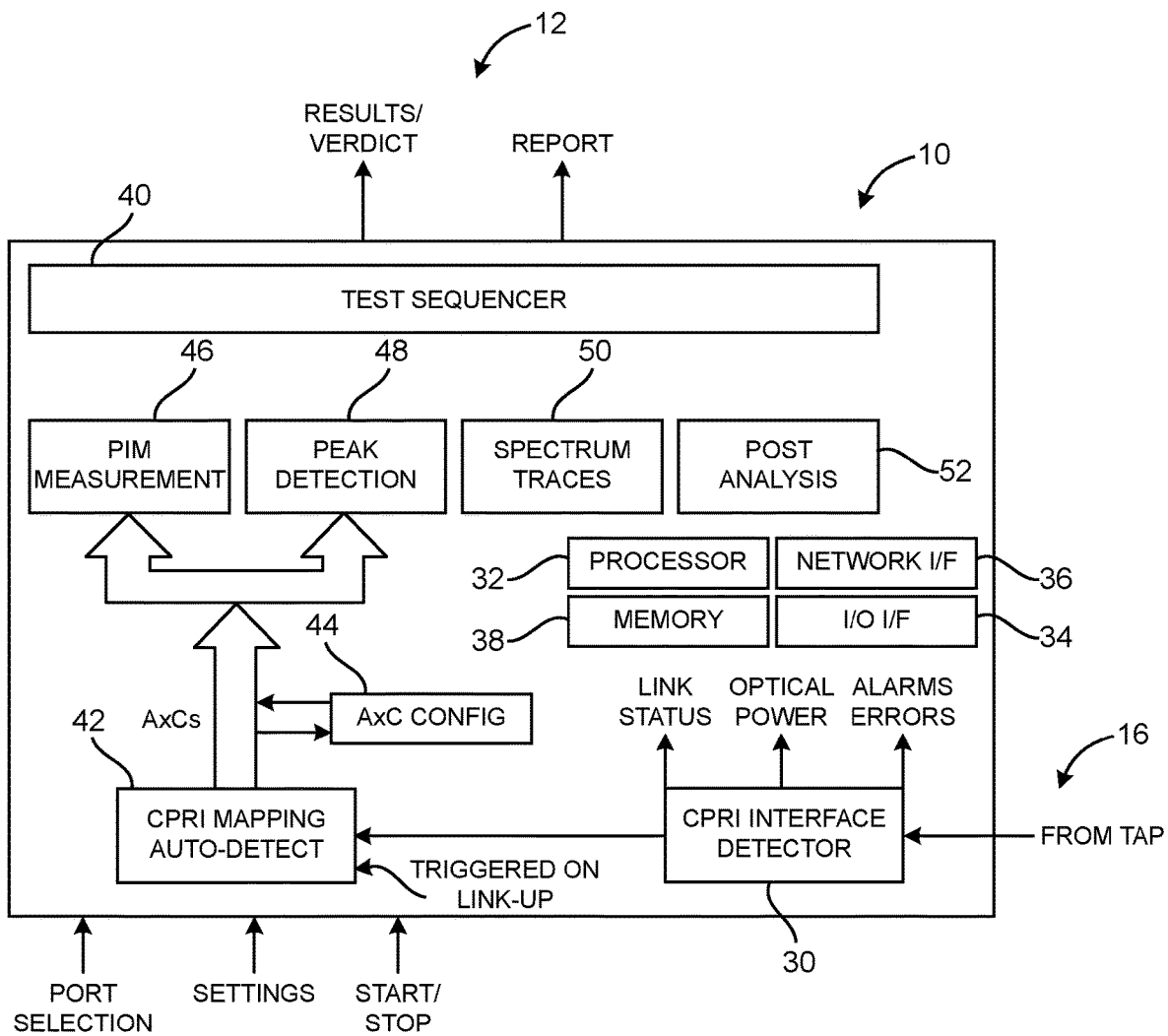
FIG. 9 is a functional block diagram of the test system of FIG. 8A.

FIG. 9 is a functional block diagram of the test system 10. The test system 10 can be a processing device that, in terms of hardware architecture, generally includes a CPRI interface detector 30, a processor 32, input/output (I/O) interfaces 34, a network interface 36, and memory 38. It should be appreciated by those of ordinary skill in the art that FIG. 9 depicts the test system 10 in an oversimplified manner, and a practical embodiment may include additional components and suitably configured processing logic to support known or conventional operating features that are not described in detail herein. The components (30, 32, 34, 36, and 38) are communicatively coupled via a local interface such as, for example, one or more buses or other wired or wireless connections, as is known in the art. The CPRI interface detector 30 is configured to connect to the CPRI link, such as via the tap. For example, when the CPRI link is a fiber optic link, the CPRI interface detector 30 can be a receiver, i.e., a photodetector, that is configured to receive a signal for processing by the test system 10. Alternatively, the CPRI link can be an electrical link as well with the tap being a splitter or the like.

The alternative test system of FIG. 8B has a data detector 30' (not shown), which replaces the CPRI interface detector 30. The data detector 30' is adapted to receive the streams of RF data over-the-air instead of via the tap 16. For example, the data detector 30' can be a receiver that is configured to receive an RF signal for processing by the test system.

The processor 32 is a hardware device for executing software instructions. The processor 32 may be any custom made or commercially available processor, a Central Processing Unit (CPU), an auxiliary processor among several processors associated with the test system 10, a semiconductor-based microprocessor (in the form of a microchip or chip set), or generally any device for executing software instructions. When the test system 10 is in operation, the processor 32 is configured to execute software stored within the memory 38, to communicate data to and from the memory 38, and to generally control operations of the test system 10 pursuant to the software instructions. The I/O interfaces 34 may be used to receive user input from and/or for providing system output to one or more devices or components. The user input may be provided via, for example, a keyboard, touchpad, and/or a mouse. System output may be provided via a display device and a printer (not shown).

The network interface 36 may be used to enable the test system 10 to communicate on a network, such as the Internet. The network interface 36 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 36 may include address, control, and/or data connections to enable appropriate communications on the network. For example, the UI 12 in FIG. 1 can be provided via a display device connected to the I/O interfaces 34 and/or via a remote device connected via a network through the network interface 36.

The memory 38 may include any of volatile memory elements (e.g., Random Access Memory (RAM, such as DRAM, SRAM, SDRAM, etc.)), nonvolatile memory elements (e.g., ROM, hard drive, tape, CDROM, etc.), and combinations thereof. Moreover, the memory 38 may incorporate electronic, magnetic, optical, and/or other types of storage media. Note that the memory 38 may have a distributed architecture, where various components are situated remotely from one another, but can be accessed by the processor 32. The software in memory 38 may include one or more software programs, each of which includes an ordered listing of executable instructions for implementing logical functions. The software in the memory 38 includes a suitable operating system (O/S) and programs. The operating system essentially controls the execution of other computer programs, such as the programs, and provides scheduling, input-output control, file and data management, memory management, and communication control and related services. The programs may be configured to implement the various processes, algorithms, methods, techniques, etc., described herein.

In addition to the components (30, 32, 34, 36, and 38), the test system 10 includes functional components such as a test sequencer 40, a PIM measurement function 46, a peak detection function 48, a spectrum traces function 50, and a post-analysis function 52. These various functions (40, 46, 48, 50, 52) can be software instructions executed on the processor 32 for automated RF analysis. Generally, the test system 10 is configured to perform multiple measurements orchestrated by the test sequencer 40.

In the embodiment where the test system 10 is configured to connect to the CPRI link, additional functional components such as a CPRI mapping auto-detect function 42 and an AxC configuration function 44 can be provided to carry out measurements on selected one of the AxCs detected by the CPRI mapping auto-detect function 42. Functions 42 and 44 can be software instructions executed on the processor 32 for automated RF analysis.

The test system 10 is a turn-up and troubleshooting tool and may be referred to as a test application or system. The test system 10 includes the test sequencer 40 which is an automated sequencer configured to fully assess the captured data. This automated sequence includes automated detection of anomalies with key characteristics (e.g., frequency, bandwidth, level) and identification of pre-defined Interference Types (e.g., a UHF Monitor, Wi-Fi hotspot), etc. The test system 10 requires minimal User Configuration (e.g., Center Frequency, Reference Power). Further, the test system 10 includes progressive reporting as tests are running, correlation of anomalies/interferences, and a reporting view with complete link assessment (e.g., tabular views, annotated RF Spectrum graphs, etc.).

In the case where the captured data is obtained on a CPRI link, the assessment includes all active AxCs. The automated sequence includes auto-discovery of CPRI link rate and Key Performance Indicator (KPI) measurements, auto-discovery of AxC mapping and automated AxC KPI measurements (e.g., PIM). The correlation of anomalies/interferences includes those observed in more than 1 AxC (e.g., external PIM).

EXAMPLE

Figure 10A:
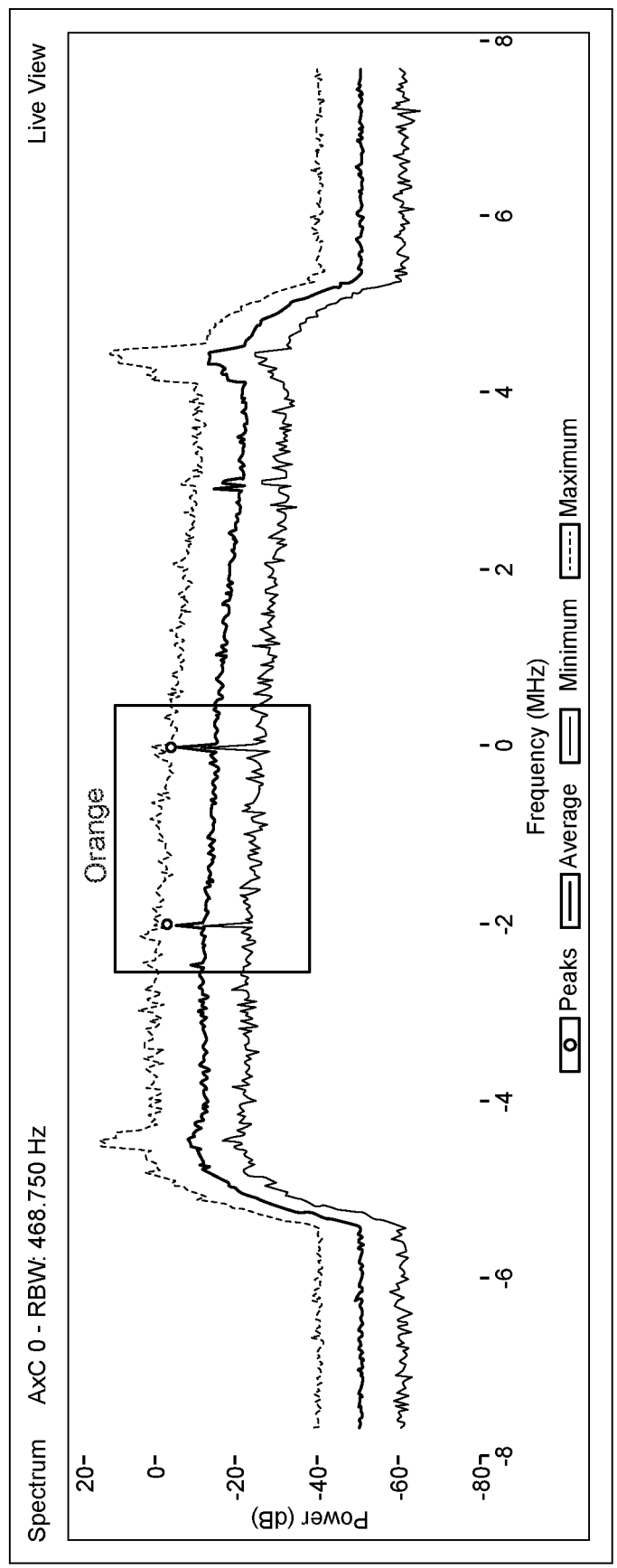
FIG. 10A is a screenshot of a user interface to display spectrum traces on which an example practical spectrum is shown with its minimum trace, its maximum trace, its average trace and its detected peaks and a framed section.

FIG. 10A shows an example practical spectrum. This example practical spectrum represents data collected in the field in an experiment. In comparison with the simulated and exaggerated trace of FIG. 3, the effect of PIM is more subtle and the narrow peak interferences have much smaller absolute power values. The carrier activity in the occupied bandwidth is noisier. The guard bands have a more typical shape. The section of the trace which is of particular interest for the present system and method is framed in orange. A visual inspection of the trace does not suffice to determine the most severe interference and a calculation of the absolute power does not yield significant results as the two peaks only have a 0.82 dB difference in absolute power, which is substantially the same absolute power.

Figure 10B:
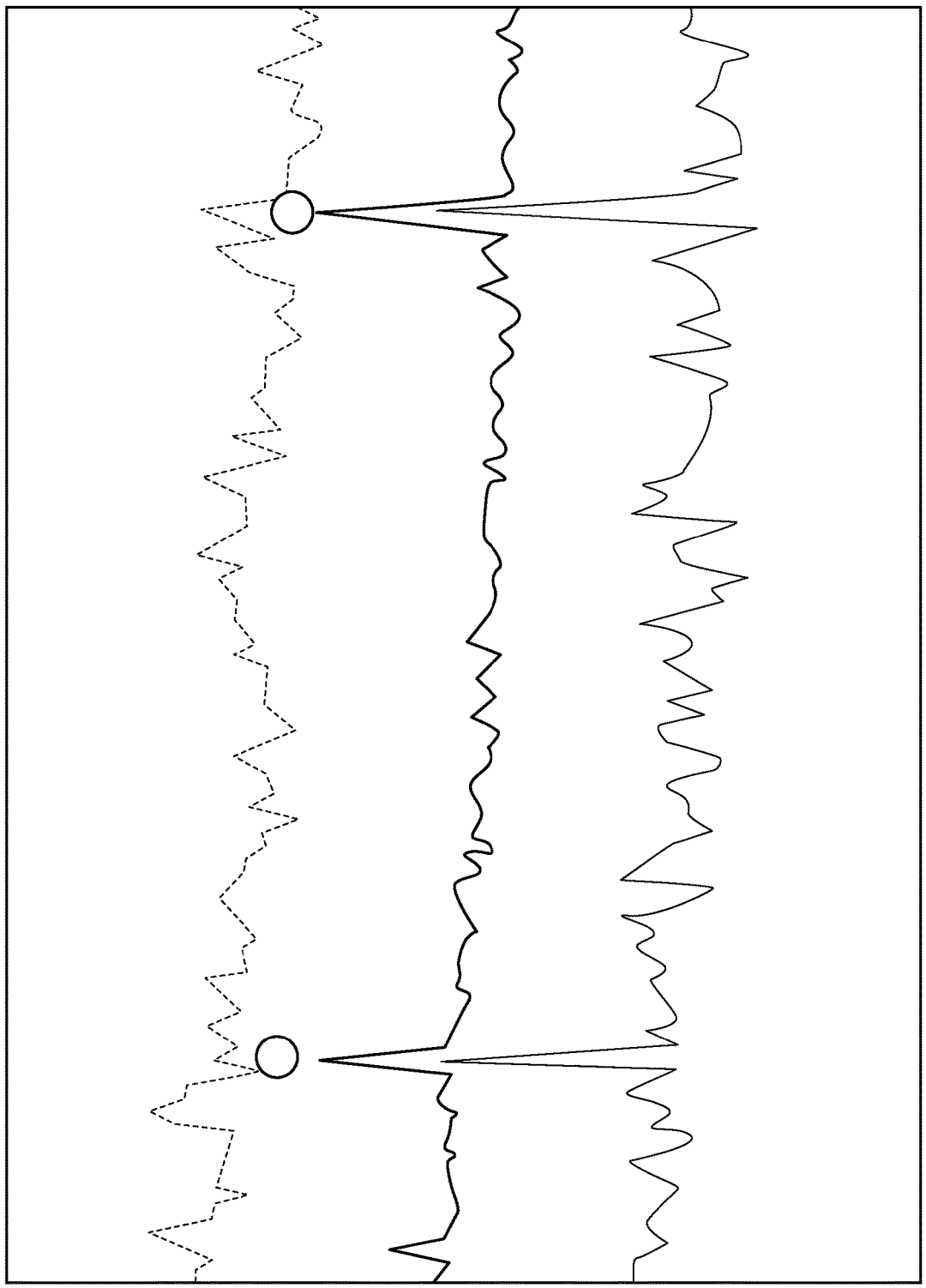
FIG. 10B is an enlarged view of the framed section of FIG. 10A.

FIG. 10B is an enlarged view of the framed section of FIG. 10A. The slope of the occupied bandwidth caused by the presence of PIM is apparent and is known to affect the relative power of each peak.

FIG. 10C shows a tabular representation of the frequency, relative power and absolute power of detected peaks of FIG. 10 as calculated by the present method and using the present system. Although the peaks only have a 0.82 dB difference in absolute power, they have a 2 dB difference in relative power. The peak on the left (peak 1) which appears to be more severe when only considering the absolute power is actually less severe than the peak on the right (peak 2) when considering the relative power as calculated by the present method.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Embodiments of the present disclosure may also take the form of a data carrier signal carrying computer program code that reproduces one or more of the claimed computer-implemented methods.

The embodiments described above are intended to be exemplary only. The scope of the invention is therefore intended to be limited solely by the appended claims.

The invention claimed is:

1. A method comprising:
obtaining, via a test system, data from one or more tests of a mobile network having at least one antenna, wherein the data includes a stream of Radio Frequency, RF, samples captured over-the-air or from a Common Public Radio Interface, CPRI, or an enhanced CPRI, eCPRI, link;
processing the data to detect peaks; performing an analysis of any detected peaks to identify any issues on the mobile network, said analysis including determining a relative power of said detected peaks with said relative power used to assign a severity estimation, wherein said determining a relative power includes obtaining a baseline power of a subset of said data and comparing an absolute power of said peak to said baseline power; and
causing display of a user interface that includes a reporting of said relative power and the severity estimation with the user interface.

2. The method as claimed in claim 1, wherein said obtaining said baseline power includes modeling said baseline power for said subset of data, said modeling including performing one of a linear regression and an average on said subset of said data to determine a baseline power function.

3. The method as claimed in claim 2, wherein said baseline power function is a constant.

4. The method as claimed in claim 2, wherein said subset of said data is all of said data.

5. The method as claimed in claim 2, wherein said obtaining said baseline further comprises averaging multiple samples of said subset of said data to obtain an average subset data set on which to perform said modeling.

6. The method as claimed in claim 2, wherein said subset of said data is an occupied bandwidth of said data and wherein said obtaining said baseline further comprises filtering said subset of data to extract data pertaining to said occupied bandwidth.

7. The method as claimed in claim 1, wherein said performing said analysis of detected peaks further includes sorting said detected peaks in order of said relative power to assign a relative severity estimation.

8. The method as claimed in claim 1, wherein said processing the data includes processing the data for selected Antenna Carriers (AxC) on the CPRI or eCPRI link.

9. The method as claimed in claim 1, wherein said causing said display includes a ranking of spectrum interferers by antenna based on the severity estimation.

10. The method as claimed in claim 9, wherein, for any two spectrum interferers, a higher severity estimation is given to a peak with a higher relative power therebetween.

11. The method as claimed in claim 9, wherein said display includes at least one spectrum interferer having a higher absolute power than another one spectrum interferer but ranked lower based on the severity estimation due to relative power.

12. The method as claimed in claim 1, wherein said processing the data includes performing Fast Fourier Transforms on said data and filtering based on an occupied bandwidth.

13. A test system comprising:
a detector comprising a receiver configured to capture a stream of RF samples over-the-air or through connection to a Common Public Radio Interface, CPRI, or enhanced CPRI, eCPRI, link;
a processor; and
memory storing instructions that, when executed, cause the processor to:
obtain data from one or more tests of a mobile network having at least one antenna, wherein the data includes a stream of Radio Frequency, RF, samples captured over-the-air or from a Common Public Radio Interface, CPRI, or an enhanced CPRI, eCPRI, link;
process the data to detect peaks; perform an analysis of any detected peaks to identify any issues on the mobile network, said analysis including determining a relative power of said detected peaks with said relative power used to assign a severity estimation, wwherein said relative power is determined by obtaining a baseline power of a subset of said data and comparing an absolute power of said peak to said baseline power; and
cause display of a user interface that includes a reporting of said relative power and the severity estimation with the user interface.

14. The test system as claimed in claim 13, wherein said baseline power is obtained by modeling said baseline power for said subset of data, said modeling including performing one of a linear regression and an average on said subset of said data to determine a baseline power function.

15. The test system as claimed in claim 13 wherein said analysis of detected peaks further includes sorting said detected peaks in order of said relative power to assign a relative severity estimation.

16. A non-transitory computer-readable storage medium having computer readable code stored thereon for programming a test system to perform the steps of:
obtaining data from one or more tests of a mobile network having at least one antenna, wherein the data includes a stream of Radio Frequency, RF, samples captured over-the-air or from a Common Public Radio Interface, CPRI, or an enhanced CPRI, eCPRI, link;
processing the data to detect peaks; performing an analysis of any detected peaks to identify any issues on the mobile network, said analysis including determining a relative power of said detected peaks with said relative power used to assign a severity estimation; and
causing display of a user interface that includes a reporting of said relative power and the severity estimation with the user interface, wherein said causing display includes a ranking of spectrum interferers by antenna based on the severity estimation and includes at least one spectrum interferer having a higher absolute power than another one spectrum interferer but ranked lower based on the severity estimation due to relative power.

17. The non-transitory computer-readable storage medium as claimed in claim 16, wherein said determining a relative power includes obtaining a baseline power of a subset of said data and comparing an absolute power of said peak to said baseline power.

18. The non-transitory computer-readable storage medium as claimed in claim 16, wherein said performing said analysis of detected peaks further includes sorting said detected peaks in order of said relative power to assign a relative severity estimation.

* * * * *